(12) United States Patent
Rensberger

(10) Patent No.: US 6,965,369 B2
(45) Date of Patent: Nov. 15, 2005

(54) METHOD AND APPARATUS FOR SMOOTHING CURSOR MOVEMENT IN RELATION TO A REFRESH RATE OF A DISPLAY

(75) Inventor: Gary Rensberger, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 315 days.

(21) Appl. No.: 10/068,979

(22) Filed: Feb. 11, 2002

(65) Prior Publication Data
US 2003/0151588 A1 Aug. 14, 2003

(51) Int. Cl.⁷ .............................. G90G 5/00
(52) U.S. Cl. ............... 345/156; 345/163; 348/734
(58) Field of Search ................ 345/156, 856; 348/734

(56) References Cited

U.S. PATENT DOCUMENTS

| | | | | |
|---|---|---|---|---|
| 5,185,597 A | * | 2/1993 | Pappas et al. | 345/856 |
| 5,327,528 A | * | 7/1994 | Hidaka et al. | 345/858 |
| 5,361,081 A | * | 11/1994 | Barnaby | 345/857 |
| 5,376,949 A | * | 12/1994 | Haigh et al. | 345/536 |
| 5,589,893 A | * | 12/1996 | Gaughan et al. | 725/37 |

* cited by examiner

Primary Examiner—Sumati Lefkowitz
Assistant Examiner—Ming-Hun Liu
(74) Attorney, Agent, or Firm—Banner & Witcoff, Ltd.

(57) ABSTRACT

A method and apparatus for smoothing cursor motion on a display is provided. In an embodiment of the invention, an indication of an amount of movement of an operation instrumentality of a pointing device in a first direction is received from the pointing device. At a reporting time, a predetermined portion of the amount of movement of the pointing device in the first direction is reported to a computer. In at least one subsequent reporting time, a remainder of the amount of the movement in the first direction is reported. Preferably, at least two reports are sent to the computer for each time an indication of the amount of movement of the pointing device is received from the pointing device. In addition to smoothing of cursor motion, higher rates of movement of the operation instrumentality can be reported for a given bit length of the reports as the total amount of movement is divided into separate smaller reports.

8 Claims, 10 Drawing Sheets

METHOD AND APPARATUS FOR SMOOTHING CURSOR MOVEMENT IN RELATION TO A REFRESH RATE OF A DISPLAY

FIELD OF THE INVENTION

The present invention relates generally to control of cursor movement on a display, and more specifically to methods and apparatus for smoothing such movement.

BACKGROUND OF THE INVENTION

Pointer or cursor movement on a raster-scanned image, such as a television screen or a computer monitor, will appear smoothest when pointer position data is updated at a rate that is at least equal to a refresh rate of a television screen or a computer monitor. The refresh rate of such a video display device is typically approximately 70 Hz, or about every 14 milliseconds. This refresh rate is faster than prior art wireless pointing devices and, as a result, perceived cursor or pointer motion controlled by such wireless pointing devices is rather jerky if the cursor position is updated only every 2–3 display refreshes. This application refers to both pointers and cursors on a display. These terms are used generally to refer to a position indicated on a display, including, but not limited to, for example, a blinking underscore, an arrow or an icon.

A conventional wired pointing device, such as, for example, a wired computer mouse, typically sends 8 bits of data indicating a change in position of the computer mouse in a first direction, for example, a horizontal direction, and another 8 bits of data indicating a change in position of the pointing device in a second direction, for example, a vertical direction, every 8 milliseconds over a port, such as, for example, a universal serial bus (USB) port. This results in a maximum pointing device speed of approximately 39 inches per second (ips), assuming a resolution of 400 dots per inch (dpi).

A wireless pointing device may send pointer position data to a receiver about every 25 milliseconds. Typically, the receiver is connected to a USB port of a computer device, such as, for example, a personal computer. The polling rate of the USB port is typically about every 8 milliseconds, or approximately three times faster than the rate at which pointer data is sent to the receiver from the wireless pointing device. Thus, typically, the receiver would provide one report through the USB port with updated pointer position data followed by two reports over the USB port with position data that is not updated. Because the pointer position is updated at a rate that is somewhat slower than the monitor refresh rate, the pointer or cursor movement using a conventional wireless pointing device may appear somewhat jerky. Further, assuming that the pointer position data is updated about every 25 milliseconds, resolution of the display is 400 dpi (0.0025 inches between pixels, and the maximum 8 bit signed value to be reported as cursor movement is 127, representing movement of 127 dots (127× 0.0025 inches=0.3175 inches), then one can see that in a one second time period, about 40 reports having a maximum value of 127 may be reported, representing a maximum movement of 40×0.3175 inches, or 12.7 inches. Thus, when using a conventional wireless pointing device, cursor movement will be limited to about 12.7 inches per second.

SUMMARY OF THE INVENTION

The present invention provides a method and apparatus for smoothing cursor motion on a display by breaking up a reported amount of movement from a pointing device into smaller amounts of movement and reporting the smaller amounts of movement at a faster rate to a data input device having the display.

In a first aspect of the invention, a method is provided for smoothing cursor movement. An indication of an amount of movement of an operation instrumentality of a pointing device in a first direction is received from the pointing device. A predetermined portion of the amount of movement in the first direction is reported to a data input device having a display. A remainder of the amount of the movement in the first direction is reported in at least one subsequent reporting step.

In a second aspect of the invention, a device for smoothing cursor movement is provided. The device includes a movement amount receiver, a movement amount determiner and a reporter. The movement amount receiver is arranged to receive, from a pointing device, a first value as an indication of an amount of movement of the pointing device in a first direction. The movement amount determiner is arranged to determine a first reporting value from the first value received from the pointing device, the first reporting value being a predetermined portion of an original value of the first value received from the pointing device. The reporter is arranged to report, in a first one of a plurality of reports, the first reporting value and, in at least one subsequent report, the remaining amount of movement.

In a third aspect of the invention, a system for smoothing cursor movement is provided. The system includes a pointing device and a receiving device. The pointing device is configured to track movement of an operation instrumentality of the pointing device in a first direction, and to report a first value as an indication of an amount of the movement in the first direction. The receiving device has a movement receiver arranged to receive, from the pointing device, the first value. The receiving device further includes a movement amount determiner and a reporter. The movement amount determiner is arranged to determine a first reporting value from the first value, the first reporting value being a predetermined portion of an original value of the first value received from the pointing device. The reporter is arranged to report, in a first one of a plurality of reports, the reporting value and, in at least one subsequent report, the remaining amount of movement.

BRIEF DESCRIPTION OF THE DRAWINGS

The present invention is described with respect to the accompanying figures, in which like reference numerals identify like elements, and in which.

DETAILED DESCRIPTION OF THE PREFERRED EMBODIMENTS

Changing the rate at which incremental position data is reported by a pointing device such that the incremental data is reported at a rate that is at least the same as the monitor refresh rate will have the effect of smoothing pointer or cursor motion on a display. One way to accomplish this is to require a vertical sync signal or an equivalent signal from a computer to the pointing device and a re-sampling operation on the position data; however, such a solution is rather complex. A simpler method is possible through the use of a Universal Serial Bus (USB).

Figure 1:
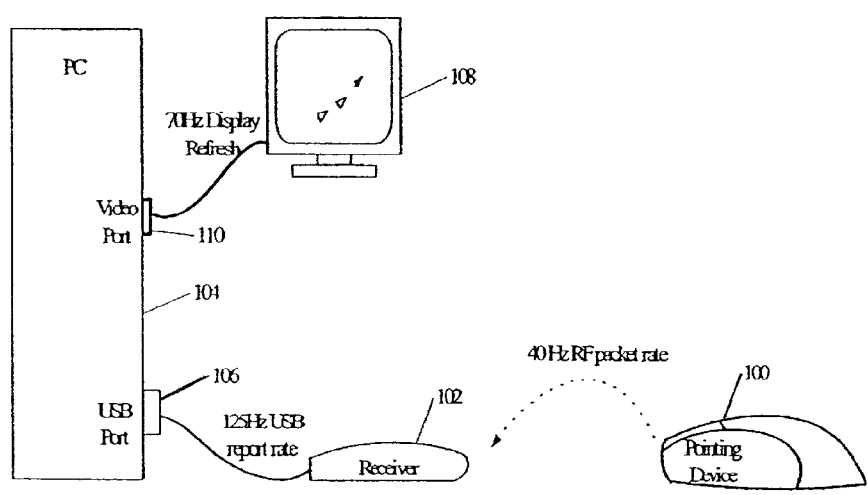
FIG. 1 diagrammatically depicts an embodiment of the invention having a pointing device, a receiving device to receive position reports from the pointing device and a computer to receive position reports from the receiving device.

FIG. 1 illustrates a pointing device 100, such as a wireless computer mouse, that sends pointer position reports, via RF signals, to a receiver 102 connected to a computer, such as a personal computer 104, via a port, such as a USB port 106. The personal computer may be connected to a computer display 108 via a video port 110.

Wireless pointing device 100 may send position data to receiver 102 at a rate of approximately 40 Hz or approximately every 25 milliseconds. The polling rate of the USB port, to which receiver 102 is connected, is typically 125 Hz or approximately every 8 milliseconds. Thus, in a conventional system, when a report of position data is received from wireless pointing device 100, the receiver would usually provide, over USB port 106, one report with updated position data and two reports with no updated position data. Therefore, the movement of the pointer or cursor on computer display 108 may appear to be somewhat jerky.

If, when polled by the USB bus, receiver 102 was to send reports of partial movement amounts reported by pointing device 100, monitor 108 could be updated more frequently. Thus, in an embodiment of the invention, receiver 102 sends at least two reports over USB port 106, corresponding to a single report received from pointing device 100, the sum of which would be the total movement amount reported by pointing device 100. The number of frames into which the position data reported by pointing device 100 is partitioned may vary for at least the following reasons: 1) the USB rate is asynchronous with the monitor refresh rate; and 2) possible variable latency in the processing of position data by a USB host. In the embodiment, generally, the cursor position is updated faster than the transmission rate of pointing device 100, thus the cursor motion is smoothed.

Figure 2:
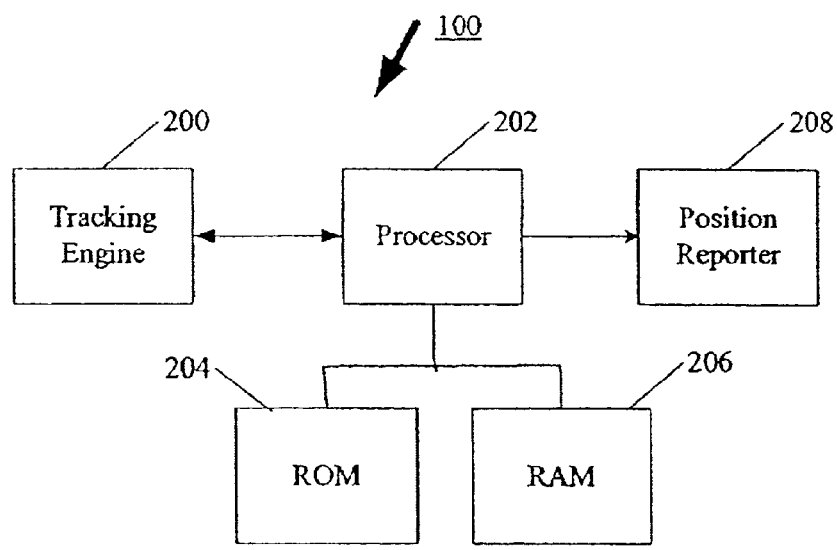
FIG. 2 is block diagram of an embodiment of the pointing device.

With reference to FIG. 2, pointing device 100 may include a tracking engine 200 to keep track of movement of an operation instrumentality of the pointing device in at least a first direction. The tracking engine keeps track of the movement of the operation instrumentality, corresponding to movement of a pointer on a display, by a number of pixels moved in at least the first direction. The amount of movement is based on movement of the operation instrumentality of the pointing device, such as, for example, a mouse body, at least a portion of the pointing device, such as, for example, a ball of a trackball device, a so-called "Z" or scrolling wheel, a pen in a pen-based data input device or a user's finger along a touch pad or the like.

Processor 202 may be connected to Read Only Memory 204 (ROM) and Random Access Memory 206 (RAM) through, for example, a bus. The processor 202 provides values representing an amount of movement of the operation instrumentality in at least a first direction to position reporter 208 for reporting position data including the amount of movement in at least the first direction to receiver 102. In the illustrated embodiment of the invention, position reporter 208 includes an RF transmitter to transmit reports including pointer position data to receiver 102.

Figure 3A:
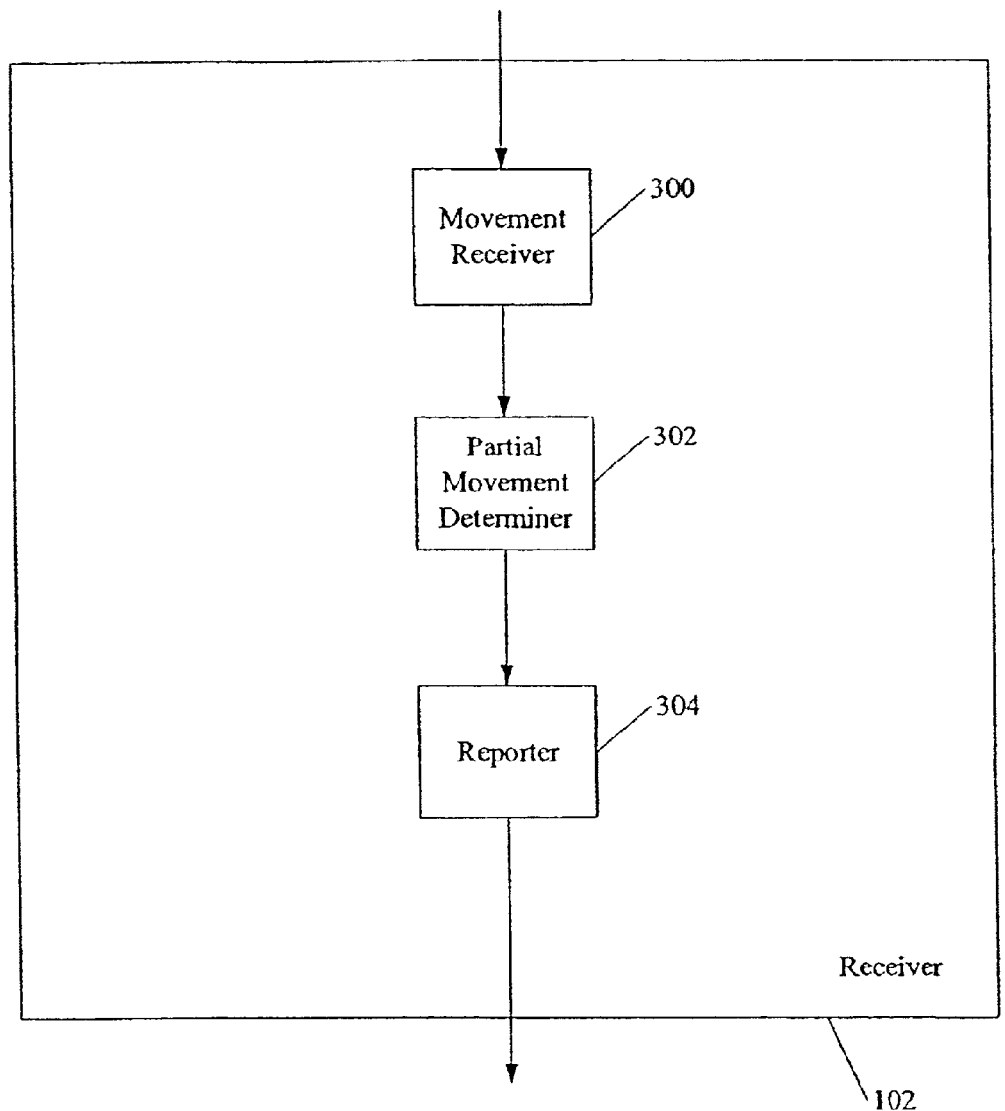
FIG. 3A is a functional block diagram of an embodiment of the receiving device.

With reference to FIG. 3A, receiver 102 includes a movement receiver 300 to receive position data from pointing device 100, a partial movement determiner 302 to divide the movement data, such that a portion of the movement in at least the first direction will be reported. The reporter 304 sends the position data to the computer 104 via, for example, USB port 106, when receiving a poll from computer 104.

Figure 3B:
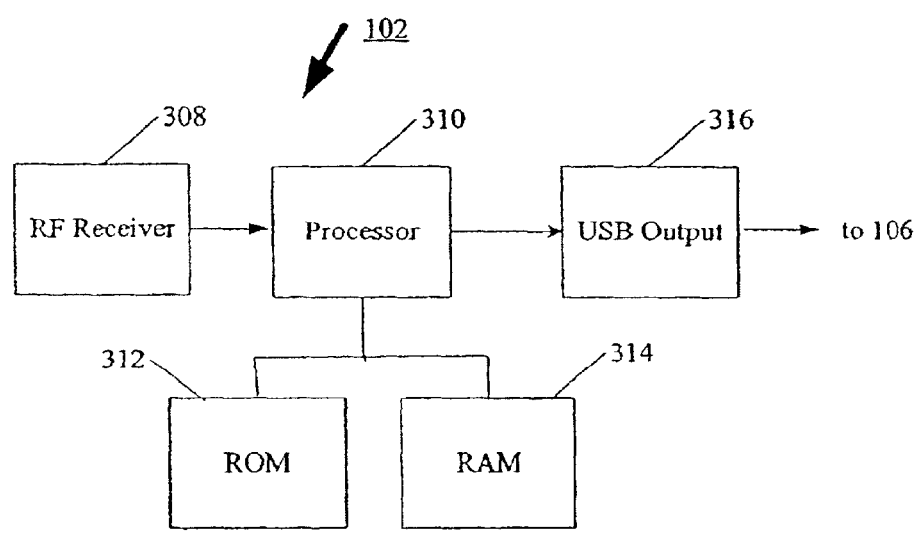
FIG. 3B is a block diagram of an embodiment of the receiving device.

With reference to FIG. 3B, an embodiment of receiver 102 includes an RF receiver 308 for receiving pointer position data reports from a wireless pointing device, a processor 310 having RAM 314 and ROM 312 including instructions for processing the received pointer position reports, and a USB output device 316 for receiving pointer position reports from processor 310 and outputting the reports to computer 104 via USB port 106.

The functional embodiment of the receiver 102, shown in FIG. 3A, may be implemented using software or firmware, or may be implemented via an application specific integrated circuit (ASIC). For example, instructions for processor 310 may be included in ROM 312 and/or copied to RAM 314 to implement the functions of the movement receiver 300, the movement determiner 302 and reporter 304.

Figure 4:
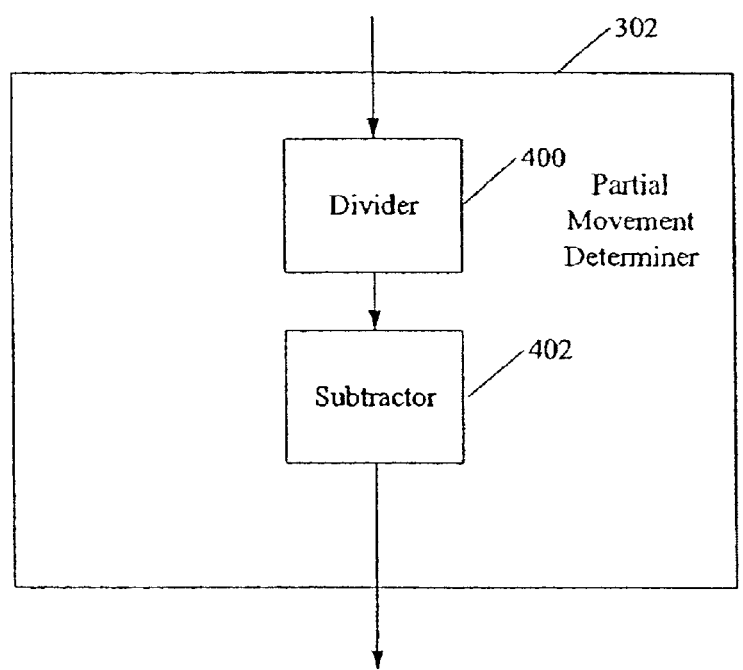
FIG. 4 is a functional block diagram of an embodiment of the movement determiner shown in FIG. 3A.

With reference to FIG. 4, in a software or firmware embodiment, movement determiner 302 includes a divider 400 to divide an amount of the movement in at least the first direction based on a reported amount of movement in at least the first direction. The divided amount of movement in the first direction is a value less than the reported amount of movement in the first direction from pointing device 100.

The subtractor 402 is arranged to subtract the amount of the divided movement in at least the first direction from the reported amount of movement in at least the first direction, thereby resulting in an amount of unreported movement in at least the first direction.

Figure 5:
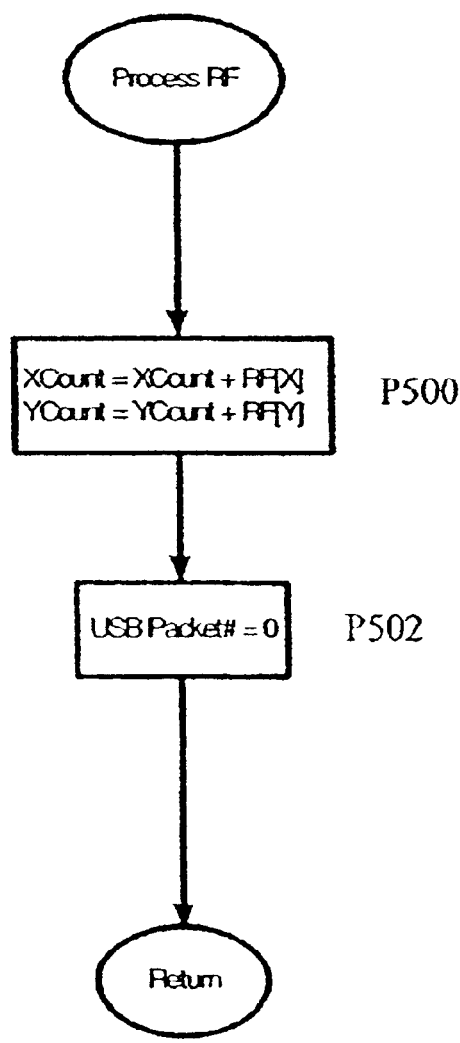
FIG. 5 is a flowchart illustrating processing in an embodiment of the receiving device when receiving position data from a pointing device.

FIG. 5 illustrates processing in an embodiment of receiver 102 when receiving position data from pointing device 100. In this embodiment two directions of movement are reported.

At P500, pointer position data for a first direction, X and a second direction, Y, are received by movement receiver 300 in, for example, an RF packet from pointing device 100. An accumulator, XCount, for accumulating position data for an X direction, and an accumulator, YCount, for accumulating position data in a Y direction, are updated to reflect the addition of the new position data for the X direction and the Y direction, respectively.

At P502, a USB packet counter is set to zero. The USB packet counter will be used by the divider 400, as will be explained later.

Figure 6:
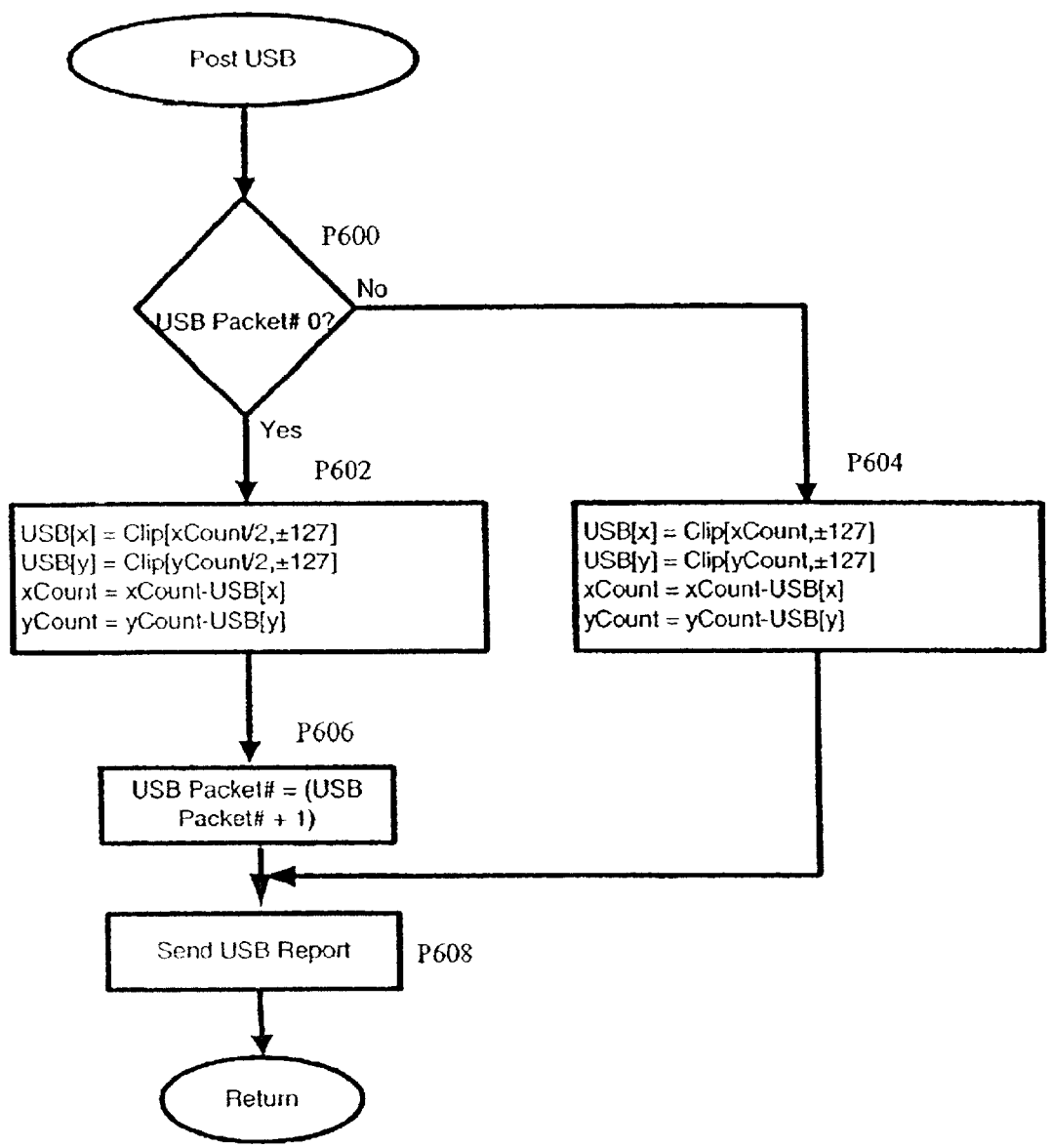
FIG. 6 is a flowchart illustrating processing in an embodiment of the receiving device when preparing to send a position report to a computer via a USB port.

FIG. 6 illustrates the processing of an embodiment of divider 400 and subtracter 402 of receiver 102 for reporting position data to computer 104 via, for example, the USB port 106.

When it is time to post position data via the USB bus, at P600, the divider 400 performs a check to determine whether the USB packet counter is set to zero. In other words, a check is performed to determine whether a first USB packet is to be sent after having received position data from the pointing device. If the USB packet counter is 0, then P602 will be performed.

At P602, the divider 400 determines the value to be reported for a first direction, X, by taking the value of XCount and dividing it by two. In this embodiment, a function called Clip determines whether the divided value of XCount is less than −127 or greater than +127. If the divided value of XCount is less than −127, than the value, USB[x], to be reported over the USB port 106, will be set to −127. If the divided value of XCount is greater than +127, then clip will set the value to report to USB port 106, USB[x], to +127. Similarly, YCount is divided by two and clip will limit the divided value of YCount to report, USB[y], to a minimum of −127 and a maximum of +127. The subtracter 402 then reduces the values of XCount and YCount by the respective reported amounts, USB[x] and USB[y], thereby indicating an amount in a direction of X and an amount in a direction of Y remaining to be reported. The reporter 304 reports USB[x] and USB[y] over USB port 106 to the computer 104.

If at P600, it is determined that this is not the first USB packet to be sent via USB port 106 after receiving a report from the pointing device (i.e., the USB packet counter is not zero), then P604 will be performed.

At P604, the divider 400 determines the values to report via the USB port, USB[x] and USB[y], by examining the values of XCount and YCount, respectively and limiting those values to a minimum of −127 and a maximum of +127. The subtracter 402 then updates the values of XCount and YCount to reflect an amount of XCount and YCount, respectively, not yet reported via USB port 106 to computer 104, by subtracting the reported amounts, USB[x] and USB[y], from XCount and YCount, respectively.

At P606, the divider 400 updates the USB packet counter by, for example, incrementing the counter by one, as illustrated, or alternatively, by setting the counter to a non-zero value.

At P608, reporter 304 sends a report including USB[x] and USB[y] via the USB port 106 to computer 104.

Figure 7:
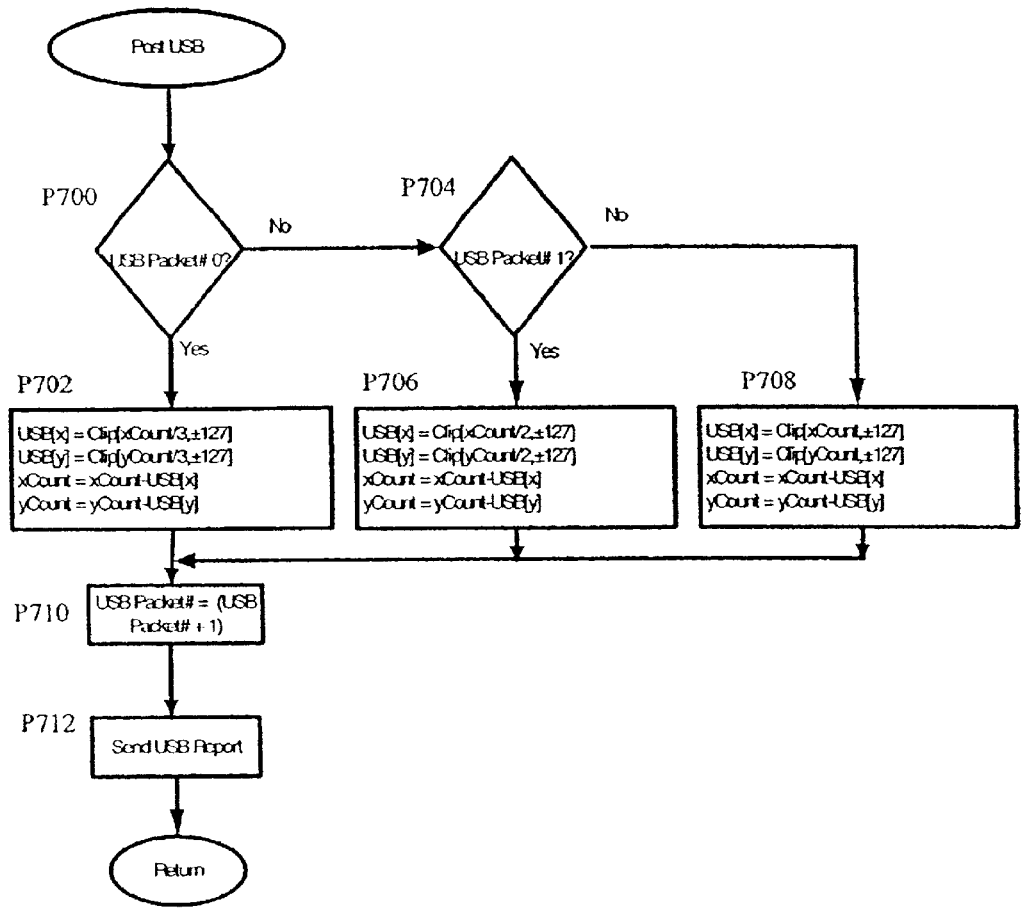
FIG. 7 is a flowchart illustrating processing in another embodiment of the receiving device when preparing to send a position report to a computer via a USB port.

FIG. 7 shows another embodiment for reporting pointer position data to computer 104 after having received position data from pointing device 100. In this embodiment, the processing by movement receiver 300 for receiving the position data from pointing device 100 is identical to the processing shown in FIG. 5 and will therefore not be discussed further.

At a time when position data is to be reported via USB port 106, at P700, divider 400 determines whether this is a first USB packet to be sent after having received pointer position data from a pointing device. In other words, a check is made to determine whether the USB packet counter is zero. If the USB packet counter is zero, then P702 will be performed.

At P702, divider 400 divides the values of XCount and YCount by 3, respectively, and the divided values are then limited to a minimum of −127 and a maximum of +127. The subtracter 402 adjusts the values of XCount and YCount, respectively, by deducting the to be reported values of X and Y, USB[x] and USB[y], respectively, such that XCount and YCount indicate the values representing movement in the X and Y directions, respectively, remaining to be reported.

If the check at P700 determines that the USB packet counter is not zero, then at P704 divider 400 determines if the USB packet counter is one. If divider 400 determines that USB packet counter is one, then P706 will be performed.

At P706, divider 400 determines the values of X and Y to be reported to the USB, USB[x] and USB[y], respectively, by dividing XCount and YCount by two, respectively and limiting the divided value to a minimum value of −127 and a maximum value of +127 and saving those values to report to the USB in USB[x] and USB[y], respectively. The partial movement determiner 400 then updates XCount and YCount to reflect an amount of movement in the X and Y directions, respectively, remaining to be reported by subtracting from XCount and YCount, respectively, the to be reported values, USB[x] and USB[y], respectively.

If at P704, divider 400 determines that the USB packet counter is not one, then P708 will be performed.

At P708, divider 400 determines the value of X and Y to be reported via USB port 106, USB[x] and USB[y], by taking the values of XCount and YCount, respectively, and limiting each of these values to a minimum value of −127 and a maximum value of +127. The subtracter 402 then updates XCount and YCount to reflect an amount of movement in the X and the Y directions not yet reported via USB port 106 by subtracting from XCount and YCount, respectively, the values USB[x] and USB[y] to be reported via the USB port 106, respectively.

At P710, the value of the USB packet counter is incremented by one.

At P712, the reporter 304 sends a report including USB[x] and USB[y] via the USB port 106 to computer 104.

Figure 8:
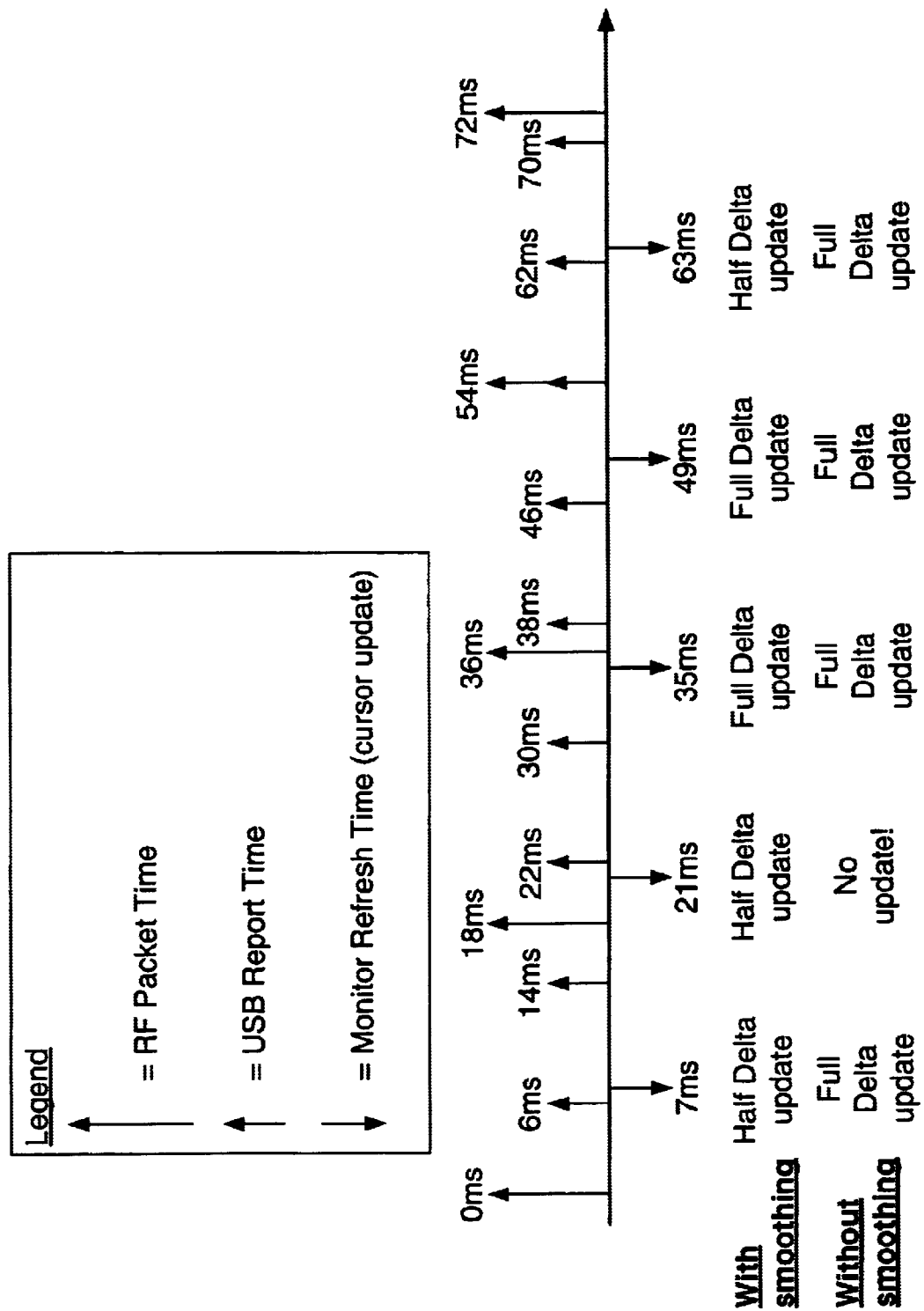
FIG. 8 is a timeline for comparing an operation of an embodiment of the invention using cursor smoothing with a system not using cursor smoothing.

FIG. 8 compares the performance of a system utilizing the inventive cursor smoothing embodiment of FIGS. 5 and 6 with a system reporting cursor updates in a conventional fashion.

In this example, the pointing device provides RF pointer position reports to the receiver every 18 milliseconds. As can be seen in the timeline, a report is provided at times zero milliseconds, 18 milliseconds, 36 milliseconds, etc.

A USB report is provided every 8 milliseconds. The timeline shows a USB report provided via the USB port at times 6 milliseconds, 14 milliseconds, 22 milliseconds, etc.

The time line shows the monitor being refreshed and the cursor being updated every 14 milliseconds. Thus, one can see the monitor refresh at times 7 milliseconds, 21 milliseconds, 35 milliseconds, etc.

In the embodiment described in FIGS. 5 and 6, receiver 102 receives a position report from pointing device 100 at time zero milliseconds. At time 6 milliseconds, the receiver sends a USB report to computer 104 to report half of the XCount and half of the YCount values (limited to a minimum of −127 and a maximum of +127).

At time 7 milliseconds, the monitor is refreshed and the cursor is updated to reflect the latest reported pointer position data.

At time 14 milliseconds, a USB report is sent from receiver 102 to computer 104 to report the remaining XCount and YCount position values.

At time 18 milliseconds, another position data report is received from pointing device 100.

At time 21 milliseconds, the monitor is again refreshed, updating the cursor position. The updated cursor position reflects the movement specified by the position data reported to computer 104 at time 14 milliseconds.

At time 22 milliseconds, the receiver 102, via movement determiner 302, divides the position data reported by the pointing device 100 at time 18 milliseconds by two and reports this amount to computer 104 via USB port 106.

At time 30 milliseconds, receiver 102 reports the remaining XCount and YCount position data, as determined by subtractor 402 to computer 104 via USB port 106.

At time 35 milliseconds, the monitor is again refreshed and the cursor updated to reflect the latest position data reported to computer 104 at times 22 and 30 milliseconds.

At time 36 milliseconds, pointing device 100 provides a next position data report to receiver 102.

At time 38 milliseconds, receiver 102, via movement determiner 302, divides the position data reported by the pointing device 100 by two and the reporter sends a USB report to computer 104 via USB port 106.

At time 46 milliseconds, receiver 102 reports the remaining XCount and YCount position data, as determined by subtractor 402 to computer 104 via the USB port 106.

At time 49 milliseconds, the monitor is refreshed and the cursor reflects a position as reported by position data in USB reports at times 38 and 46 milliseconds.

At time 54 milliseconds, pointing device 100 reports position data to receiver 102 and receiver 102 sends a USB report to computer 104 via USB port 106. Since no unreported received pointer position data exists at this time, no change in position data is reported to computer 104 via USB port 106.

At time 62 milliseconds, receiver 102, via the movement divider, divides the reported XCount and YCount position data from the pointing device, by two and sends a position report to computer 104 via USB port 106.

At time 63 milliseconds, computer monitor 108 is refreshed and the cursor data is updated to reflect the pointer position as reported at times 54 and 62 milliseconds.

At time 70 milliseconds, receiver 102 reports the remaining XCount and YCount position data, as determined by subtractor 402, to computer 104 via USB port 106. In this example, there should be no remaining unreported position data.

At time 72 milliseconds, position data is reported from the pointing device 100 to the receiver 102.

From the above example, one can see that at each of the monitor refresh times, a cursor update is performed based on either the full reported changes in the X and Y positions or half of the reported changes in the X and Y positions.

Looking at the time line in FIG. 8, without cursor smoothing, at time zero milliseconds, a report is received from pointing device 100 including position data.

At time 6 milliseconds, a USB report including the full X and Y position data is sent by receiver 102 to computer 104 via USB port 106.

At time 14 milliseconds, a USB report shows no change in the position data reported from the receiver to the computer because no additional position data was received from pointing device 100 since the last USB report was sent to computer 104.

At time 18 milliseconds, the pointing device sends a report including position data to the receiver.

At time 21 milliseconds, the monitor is refreshed and the cursor is updated to reflect a change in pointer position reported to computer 104 at time 6 milliseconds.

At time 22 milliseconds, receiver 102 sends a USB report reporting the full X and Y position data as reported by pointing device 100 at time 18 milliseconds.

At time 30 milliseconds, a USB report is sent from receiver 102 to computer 106 reporting no change in position.

At time 35 milliseconds, the monitor is refreshed to reflect a cursor position last reported by receiver 102 to computer 104 at time 22 milliseconds.

At time 36 milliseconds, pointing device 100 sends a report including position data to receiver 102.

At time 38 milliseconds, receiver 102 sends a USB report to computer 104 reporting the full change in position, as reported by pointing device 100 to receiver 102 at time 36 milliseconds.

At time 46 milliseconds, a USB report is sent to computer 104 reporting no change in position.

At time 49 milliseconds, the monitor is refreshed and the cursor position is updated to reflect the position as last reported at 38 milliseconds, since no position change was reported at time 46 milliseconds.

At time 54 milliseconds, a USB report is sent from receiver 102 to computer 104, reporting no change in position and position data is sent from pointing device 100 to computer 104.

At time 62 milliseconds, receiver 102 sends a report to computer 104 reporting the full change in position, as reported from pointing device 100, to receiver 102 at time 54 milliseconds.

At time 63 milliseconds, the monitor is refreshed and the cursor is updated to reflect a position based on the position data reported to computer 104 at time 62 milliseconds.

At time 70 milliseconds, a USB report is sent from receiver 102 to computer 104, showing no change in position.

At time 72 milliseconds, position data is received by receiver 102 from pointing device 100.

Looking at the example in FIG. 8, without cursor smoothing, when a monitor refresh occurs, either all of the reported position data is reflected by the monitor refresh, or no change in cursor position is reflected by the monitor refresh. Further, when a change in position is reported via a USB report, larger changes tend to be reported than when using embodiments of the invention. Thus, a user would see either a larger change in cursor position, when compared with embodiments of the invention, or no change in cursor position from one monitor refresh to the next. As a result, the cursor movement may appear somewhat jerky.

With cursor smoothing, the changes in cursor position from one monitor refresh to the next tend not to be as great as without cursor smoothing, i.e., the movement is more smooth than the movement observed when cursor smoothing is not used.

Figure 9:
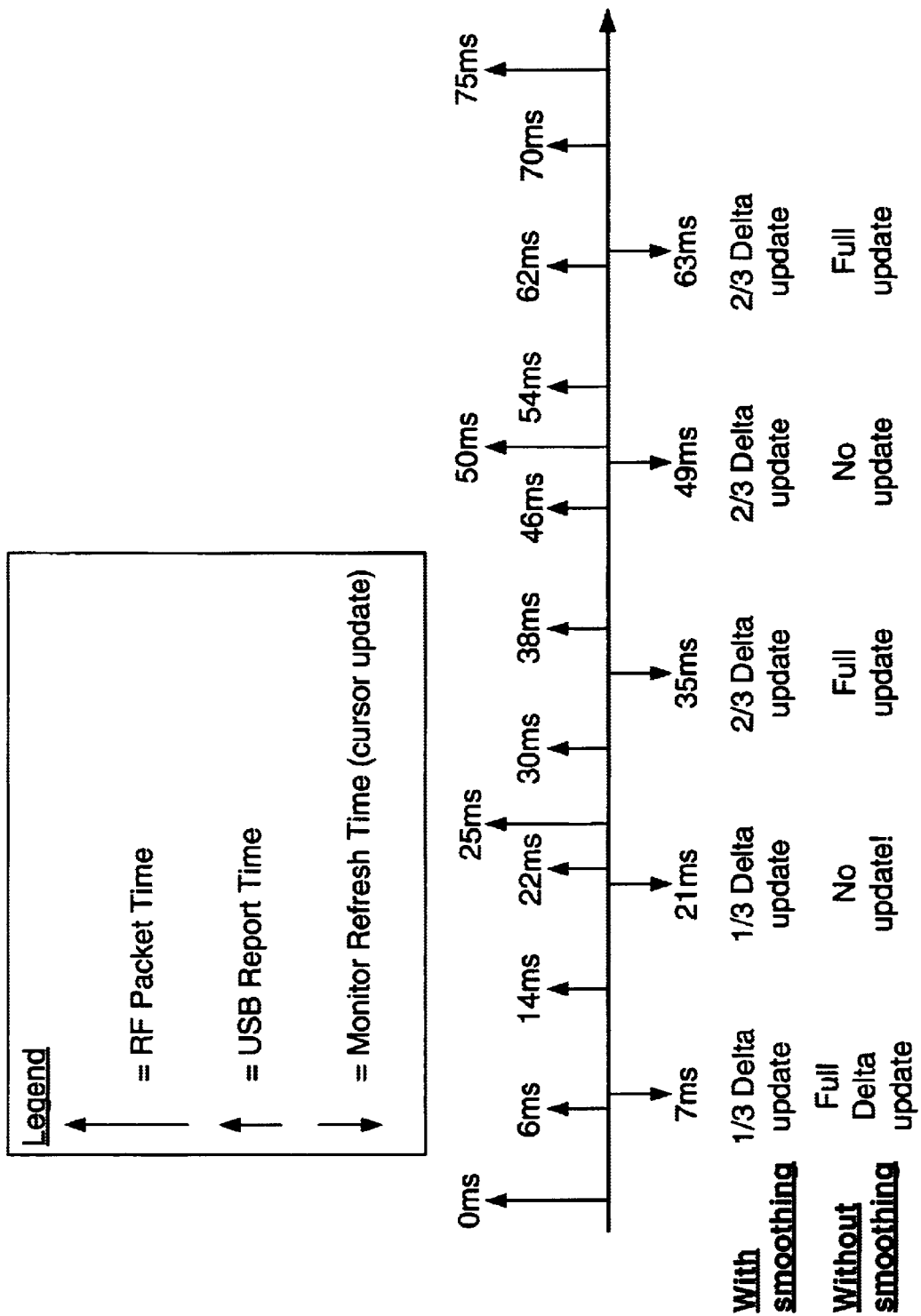
FIG. 9 is a timeline for comparing an operation of another embodiment of the invention using cursor smoothing with a system not using cursor smoothing.

FIG. 9 shows a timeline comparing pointer movement using the embodiment of the invention described in FIGS. 5 and 7 vs. using no cursor smoothing. In this example, pointing device 100 reports position data to receiver 102 every 25 milliseconds. As one can see from the timeline, pointing device 100 sends position data to receiver 102 at time zero milliseconds, 25 milliseconds, 50 milliseconds, and 75 milliseconds. USB reports from receiver 102 to computer 104 are sent every 14 milliseconds. In this example, USB reports are sent from receiver 102 to computer 104 at times 6, 14, 22, 30, 38, 46, 54, 62 and 70 milliseconds. The monitor is refreshed at 14 milliseconds, as in the previous example, as is shown at times 7, 21, 35, 49 and 63 milliseconds.

Using the embodiment of the invention described in FIG. 5 and 7, each of the USB reports sends to computer 104 approximately one third of the value of the position data reported by the pointing device to receiver 102. When the determined value to report via USB port 106 is outside the range of −127 to +127, the value is set to a minimum of −127 if the determined value is less than negative 127, or a maximum of +127 when the determined value is greater than positive 127.

Looking at the timeline of FIG. 9, when not using cursor smoothing, the first USB reporting time after a report is sent from pointing device 100 to receiver 102, reports the complete position data, as reported by pointing device 100. Other USB reports sent to computer 104 after the position data was reported by receiver 102 to computer 104, but before receiver 102 receives any additional position data reports from pointing device 100, will reflect no change in pointer position. Therefore, in the example of FIG. 9 without cursor smoothing, cursor movement can be observed only at monitor refresh times 7 milliseconds, 35 milliseconds and 63 milliseconds, while cursor movement may be observed by a user using the embodiment of the invention described in FIGS. 5 and 7, at monitor refresh times 7 milliseconds (⅓ delta update), 21 milliseconds (⅓ delta update), 35 milliseconds (⅔ delta update), 49 milliseconds (⅔ delta update) and 63 milliseconds (⅔ delta update). As a result, one may observe a significantly smoother cursor movement as compared to using a conventional system without cursor smoothing.

Another benefit of the embodiments of the invention is that by redistributing the reports from the pointing device, such that only a portion of the movement is reported to the computer via each report over the USB port, a full 39 ips (at 400 dpi resolution) tracking speed can be achieved without increasing the number of bits sent in a report from pointing device 100 or from receiver 102. More specifically, and as mentioned, 8 bits permits a maximum amount of movement, 127 pixels, or 0.3175 inches at a 400 dpi resolution, to be reported from receiver 102, via USB port 106, to computer 104 when a USB report is sent to computer 104 every 8 milliseconds (125 times per second). The maximum amount of movement that can be reported per second is then 0.3175 inches per second×125 reports per second, which is 39.6875 inches per second. In contrast, when not using the invention, 8 bits representing a maximum amount of movement are sent via, for example, a wireless reporting device, to receiver 102 about every 20–30 milliseconds. Assuming that the wireless pointing device sends reports every 25 milliseconds (40 times per second), and that the maximum reported movement amount is 127, representing 127 dots of movement (0.3175 inches at 400 dpi resolution), then because receiver 102, in a conventional system, sends the full amount of movement reported by a pointing device over USB port 106, the maximum amount of movement per second that can be reported is 0.3175 inches per second×40 reports per second, which is 12.7 inches per second. This is so because, in a conventional system, on average, receiver 102 sends about 40 position reports per second reporting movement over USB port 106 and sends the remaining reports over USB port 106 reporting no movement.

The present invention has been described in terms of preferred and exemplary embodiments thereof. Numerous other embodiments, modifications and variations within the scope and spirit of the appended claims will occur to persons of ordinary skill in the art from a review of this disclosure. In the claims, the use of the labels for algorithm variables appearing in the specification is for convenience and clarity and is not intended to have any limiting effect.

What is claimed is:

1. A method of smoothing cursor movement, the method comprising:

receiving, from a pointing device, an indication of an amount of movement of an operation instrumentality of the pointing device in a first direction;

reporting to a data input device having a display, at a reporting time, a predetermined portion of the amount of the movement in the first direction; and reporting, in at least one subsequent reporting step, a remainder of the amount of the movement in the first direction, wherein an amount of time between report times is no larger than an amount of time between refreshes of the display.

2. The method of claim 1, wherein at least two reporting steps are performed for each one time the receiving step is performed.

3. The method of claim 1, wherein:

the step of receiving further comprises receiving, from the pointing device, an indication of an amount of movement of the pointing device in a second direction, the step of reporting to the data input device having the display further comprises reporting to the data input device, at the reporting time, a predetermined portion of the amount of the movement in the second direction, and the step of reporting in at least one subsequent reporting time further comprises reporting, in said at least one subsequent reporting step, a remainder of the amount of the movement in the second direction.

4. The method of claim 1, wherein at least three said reporting steps are performed to report the amount of movement.

5. The method of claim 1, wherein a first value, received from the pointing device, represents the indication of an amount of movement in the first direction, the method further comprising:

deriving a first reporting value from the first value, the first reporting value being less than an original value of the first value received from the pointing device;

subtracting the first reporting value from the first value to update the first value to indicate a remaining amount of movement in the first direction not yet reported, wherein a first one of the reporting steps reports the first reporting value and the remaining amount of movement is reported in said at least one subsequent reporting step.

6. The method of claim 5, wherein a second value, received from the pointing device, represents the indication of an amount of movement in the second direction, the method further comprising:

deriving a second reporting value from the second value, the second reporting value being less than an original value of the second value received from the pointing device;

subtracting the second reporting value from the second value to update the second value to indicate a remaining amount of movement in the second direction not yet reported, wherein the first one of the reporting steps reports the second reporting value and the remaining amount of movement is reported in said at least one subsequent reporting step.

7. The method of claim 1, wherein the predetermined portion of the amount of movement reported to the data input device is limited to a predefined maximum value and the remaining amount of movement that is subsequently reported includes an amount of movement in excess of the predefined maximum value.

8. An apparatus for smoothing cursor movement, comprising:

an input configured to receive first data representing a series of original movement amounts of a pointing device at a first regular interval;

a processor configured to partition the original movement amounts into smaller movement amounts; and an output configured to output second data representing a series of the smaller movement amounts at a second regular interval to a computer having a display, the display being refreshed at a third regular interval, the second regular interval being shorter than the first and third regular intervals, the first regular interval being longer than the third regular interval.

* * * * *

UNITED STATES PATENT AND TRADEMARK OFFICE
CERTIFICATE OF CORRECTION

| | | |
|---|---|---|
| PATENT NO. | : 6,965,369 B2 | Page 1 of 1 |
| APPLICATION NO. | : 10/068979 | |
| DATED | : November 15, 2005 | |
| INVENTOR(S) | : Rensberger | |

It is certified that error appears in the above-identified patent and that said Letters Patent is hereby corrected as shown below:

In column 4, line 65, delete "subtracter" and insert -- subtractor --, therefor.

In column 5, line 19, delete "subtracter" and insert -- subtractor --, therefor.

In column 5, line 34, delete "subtracter" and insert -- subtractor --, therefor.

In column 5, line 63, delete "subtracter" and insert -- subtractor --, therefor.

In column 6, line 23, delete "subtracter" and insert -- subtractor --, therefor.

In column 8, lines 66-67, delete "FIG. 5 and 7" and insert -- FIGS. 5 and 7 --, therefor.

Signed and Sealed this

Twenty-fifth Day of August, 2009

David J. Kappos
*Director of the United States Patent and Trademark Office*